United States Patent
Luethge et al.

(10) Patent No.: US 6,960,250 B2
(45) Date of Patent: *Nov. 1, 2005

(54) CARBONACEOUS MATERIAL

(75) Inventors: Thomas Luethge, Hanau (DE); Heinz Zoch, Maintal (DE); Ralph McIntosh, Hanau (DE); Klaus Bergemann, Kerpen-Sindorf (DE); Egon Fanghaenel, Halle (DE); Bernd Knackfuss, Leipzig (DE)

(73) Assignee: Degussa AG, Duesseldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/640,008

(22) Filed: Aug. 14, 2003

(65) Prior Publication Data

US 2004/0138342 A1 Jul. 15, 2004

(30) Foreign Application Priority Data

Aug. 15, 2002 (DE) .......................... 102 38 149

(51) Int. Cl.⁷ ............................ C08K 3/04; C08K 9/00; C08K 5/00; C09C 1/56; C07C 245/02
(52) U.S. Cl. ................ 106/476; 106/472; 106/473; 106/31.8; 106/31.9; 523/215; 524/190; 524/495
(58) Field of Search ................ 106/472, 473, 106/476, 31.8, 31.9; 523/215; 524/190, 495

(56) References Cited

U.S. PATENT DOCUMENTS

| 5,554,739 | A | * | 9/1996 | Belmont ................ 534/885 |
| 6,660,075 | B2 | * | 12/2003 | Bergemann et al. ........ 106/476 |
| 6,758,891 | B2 | * | 7/2004 | Bergemann et al. ....... 106/31.8 |
| 2001/0036994 | A1 | * | 11/2001 | Bergemann et al. ........ 524/495 |

FOREIGN PATENT DOCUMENTS

| EP | 0 569 503 | 11/1993 |
| EP | 1 304 362 | 4/2003 |
| JP | 11-323229 | 11/1999 |

* cited by examiner

*Primary Examiner*—Anthony J. Green
(74) *Attorney, Agent, or Firm*—Oblon, Spivak, McClelland, Maier & Neustadt, P.C.

(57) ABSTRACT

A carbonaceous material with organic groups obtainable by reacting carbonaceous material with organic compounds of the general formula I $$R^1\text{—}N\text{=}N\text{—}R^2 \qquad (I).$$

The carbonaceous material with organic groups is produced by reacting the carbonaceous material with an organic compound of the general formula I. The material may be used as a filler, reinforcing filler, UV stabilizer, conductive carbon black or pigment.

44 Claims, No Drawings

CARBONACEOUS MATERIAL

BACKGROUND OF THE INVENTION

1. Field of the Invention

The invention relates to a carbonaceous material, to a process for the production thereof and to the use thereof.

2. Description of the Related Art

There exist many known processes used for the production of derivatized carbonaceous materials. These processes typically involve using derivitization reagents or conditions that are generally considered disadvantageous. Such pitfalls include, but are not limited to; instability and toxicity of derivitization reagents needed to effect such reactions. Furthermore, these reagents present handling problems, as they can undergo uncontrollable decomposition during the course of the reaction. In many instances, strongly acidic media must be used; thereby necessitating the use of special reaction vessels. The following disclosures are of interest to the instant invention, as they possess some of the disadvantages mentioned herein.

EP 0569503 discloses a process for surface-modifying carbonaceous material with aromatic groups by electrochemical reduction of a diazonium salt.

It is furthermore known to provide carbonaceous material with organic groups by coupling the organic groups with the carbonaceous material by diazotization (WO 96/18688).

It is further known to provide carbonaceous material with organic groups by binding the organic groups to the carbonaceous material by means of reactions with free-radical formers (Ohkita K., Tsubokawa N., Saitoh E., Carbon 16 (1978) 41); DE 10012784.3) or by cycloaddition reactions (DE 10012783.5).

It is known to react carbonaceous material with aliphatic compounds which have azo groups (JP11315220 A; Tsubokawa N., Kawatsura K., Shirai Y., Int. Conf. Mater. Proc. 11 (1997) 537; Tsubokawa N., Yanadori K., Sone Y., Nippon Gomu Kyokaishi 63 (1990) 268). The bond is formed between the compounds containing azo groups and the carbonaceous material with elimination of nitrogen and formation of free-radical species, which may act as starter functions for further reactions (grafting).

It is likewise known to modify carbonaceous material by reaction with sulfuric acid or $SO_3$ (U.S. Pat. No. 3,519,452; JP 2001-254033).

There exist other known processes that have known disadvantages, which are noted as follows. It is known that the commonly employed oxidizing substance sodium nitrite is toxic, but the nonionic organic nitrites also used for diazotization are toxic and highly combustible as well. The resultant by-products of the organic nitrites (e.g., counterions, alkyl residues) become incorporated within the confines of the carbonaceous material as contaminants.

Another type of problem encountered while using nitrites is that the diazotization reaction occurs in an acidic medium, which may result in the formation of toxic nitrogen oxides.

Another issue of concern is the utilization of free-radical formers that are thermally or photochemically labile, and as a result possess explosive tendencies. This aspect gives rise to substances that may give rise to chain reactions that are difficult to control. Compounding this problem is found in the fact that the synthesis and purification of the corresponding precursors of the free-radical formers, in some cases, involve substances that are toxic or are unpleasantly odoriferous; which typically means that they are costly with regard to the production process, transport, use and ultimate disposal.

Yet another complicating issue is that cyclization reactions involving nitrogen-heterocycles gives rise to nitrogen extrusion during the course of the conversion from reactants to products, which may result in sudden, explosive expansions in volume or increases in pressure, which substantially complicate reaction control.

Additionally, the reaction of carbonaceous material with compounds which have azo groups can form free-radicals with concomitant nitrogen extrusion, and may likewise result in sudden, explosive expansions in volume or increases in pressure, or alternatively in chain reactions which are difficult to control thermally and so complicate reaction control.

As mentioned above, the reactions, in many instances, must occur within acidic media; thereby requiring that the reaction vessels be constructed from particularly stable, corrosion- and temperature-resistant materials. When carbonaceous material is reacted in the presence of either sulfuric or fuming sulfuric acid, unwanted and hazardous oxidations may occur as secondary reactions. These strongly acidic media require neutralization at the conclusion of the reaction; wherein said neutralization produces a large amount of wastewater and increases the overall salt content of the media, which subsequently may be incorporated into the carbonaceous material, which, in turn, may lead to applicational disadvantages.

Accordingly, it is an object of the present invention to overcome these disadvantages by producing a carbonaceous material with organic groups, wherein: (1) modification of the carbonaceous material is variable in such a manner that the functional groups may be close to and/or very distant from the surface; (2) modification of the carbonaceous material proceeds without upstream reactions, such as activation with starters; (3) the reactions with the modifying agents according to the invention proceed purely thermally and no further catalysts (for example Lewis acids) or other activation variants, such as for example photochemical processes, are required; (4) due to the chemical properties of the modifying agents according to the invention, no disruptive secondary reactions or difficult to control chain reactions can occur; (5) the resultant carbonaceous material is not contaminated by acids, salts and the like, such that no purification of the carbonaceous material is necessary; (6) the carbonaceous material does not need to be dried with an elevated energy input; (7) no toxic waste gases arise during the modification; (8) no or only small quantities of readily removable solvents are necessary.

SUMMARY OF THE INVENTION

Accordingly, it is an object of the present invention to provide a carbonaceous material with organic groups, which is obtainable by a process, which comprises:

contacting an organic compound of formula I with a carbonaceous material under conditions that are sufficient to cause a reaction;

$$R^1-N=N-R^2 \qquad (I)$$

wherein $R^1$ and $R^2$ may be identical or different and are aryl groups which are unsubstituted or substituted with acceptor or donor substituents.

DETAILED DESCRIPTION OF THE INVENTION

Thus, in a first embodiment, the present invention provides a carbonaceous material with organic groups, which is obtainable by a process, which comprises:

contacting an organic compound of formula I with a carbonaceous material under conditions that are sufficient to cause a reaction;

wherein $R^1$ and $R^2$ may be identical or different and are aryl groups which are unsubstituted or substituted with acceptor or donor substituents.

As mentioned above, the organic compounds of general formula (I)

comprise substituents, $R^1$ and $R^2$, which may be identical or different and are aryl groups which are unsubstituted or substituted with acceptor or donor substitents.

Additionally, the groups $R^1$ and $R^2$ may be part of a cyclic system.

The acceptor or donor substituents may be hydrophilic or hydrophobic. The structural unit of formula (I) (i.e., the azo group) may be present in the organic group once or in multiple instances.

Acceptor substituents may be $-COOR^3$, $-COR^3$, $-CN$, $-SCN$, $-NCS$, $-NCO$, $-NO_2$, $-SO_2R^3$, $-SO_2N(R^3)_2$, $-SO_3R^3$, $-SO_3X$, $-COOX$; wherein $R^3$ is identical or different and is selected from the group consisting of H, an alkyl, an aryl, a functionalized alkyl, and a functionalized aryl; wherein functionalities present on the alkyl or aryl group include examples not limited to $-COOH$, $-SO_3H$, $-NH_2$, and $-SO_2NH_2$ which yields, for example, $\omega$-$HOOC-C_xH_y$, $HSO_3-C_xH_y-$, $H_2N-C_xH_y-$ or $H_2NSO_2-C_xH_y-$ (where x=1–20 and y=2–40); and wherein X is selected from the group consisting of H, an alkali metal ion, and an ammonium ion.

Donor substituents may be alkyl or aryl groups, $OR^4$, $N(R^4)_2$, $SR^4$, $-S-S-R^4$ or $P(R^4)_2$, wherein $R^4$ is identical or different and is selected from the group consisting of H, an alkyl, an aryl, a functionalized alkyl, and a functionalized aryl; wherein functionalities present on the alkyl or aryl group include examples not limited to $-COOH$, $-SO_3H$, $-NH_2$, and $-SO_2NH_2$ which yields, for example, $\omega$-$HOOC-C_xH_y$, $HSO_3-C_xH_y-$, $H_2N-C_xH_y-$ or $H_2NSO_2-C_xH_y-$ (where x=1–20 and y=2–40).

The organic groups $R^1$ and $R^2$ may be different or identical, substituted or unsubstituted, aromatic or heteroaromatic, branched or unbranched. Furthermore, they may comprise an aliphatic group, by way of example said aliphatic groups are generally classified as alkanes, alkenes, alcohols, ethers, aldehydes, ketones, carboxylic acids, carboxylic acid esters, carboxylic acid amides, hydrocarbons, sulfonic acids, trialkylammonium, trialkylphosphonium or dialkylsulfonium. Additionally, they may comprise non-hetero- or heterocyclic compounds. Examples of non-heterocyclic compounds include, but are not limited to, alicyclic hydrocarbons, for example cycloalkyls or cycloalkenyls. Examples of heterocyclic compounds include, but are not limited to, for example, pyrrolidinyl, pyrrolinyl, piperidinyl or morpholinyl. The organic groups $R^1$ and $R^2$ may comprise aryl or heteroaryl groups. Examples of aryl groups include, but are not limited, to the following examples phenyl, naphthyl or anthracenyl; and heteroaryl groups, are illustrated by examples that include imidazolyl, pyrazolyl, pyridinyl, thienyl, thiazolyl, furyl or indolyl. These substituents may be substituted by further functional groups. They may comprise a chromophoric group or a dye or parts thereof, and they may bear suitable reactive compounds, such as for example triarylammonium, triarylphosphonium, diarylsulfonium or aryliodonium.

The substituents of the carbonaceous material with organic groups according to the invention may here be tailored to potential areas of application, as the identified reaction principle permits, for example, the introduction of both hydrophilic and lipophilic substituents. The substituents may also be ionic, polymeric or reactive in further reactions. Various properties of the carbonaceous material which are of great applicational significance may purposefully be modified by means of the substituents. For example, the hydrophilicity of the carbonaceous material may be increased to such an extent that the carbonaceous material forms stable dispersions in aqueous media without the use of a wetting agent.

Suitable azo compounds according to the invention may be:

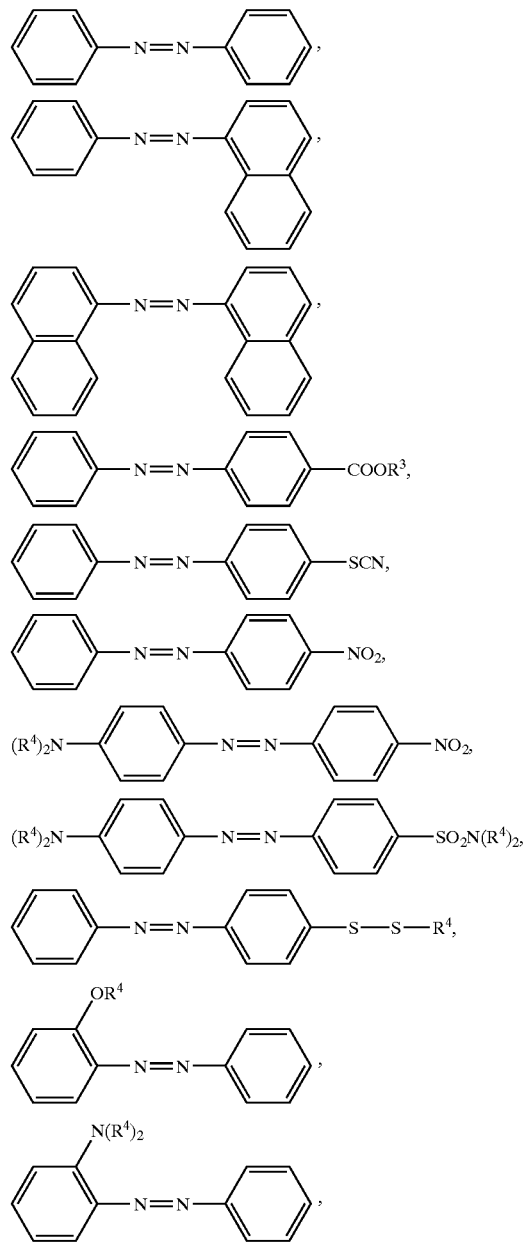

-continued
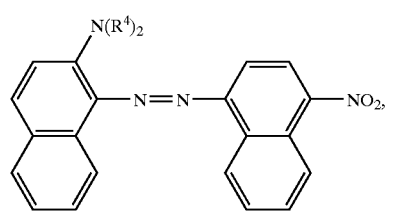
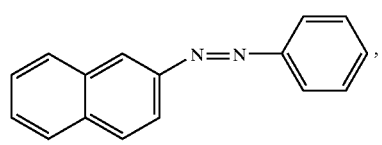
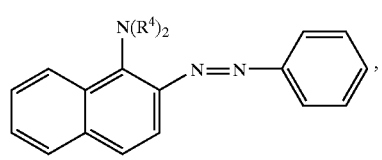
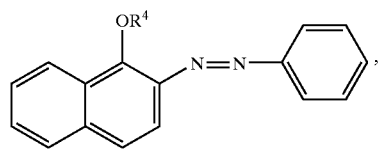
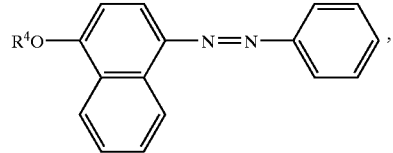
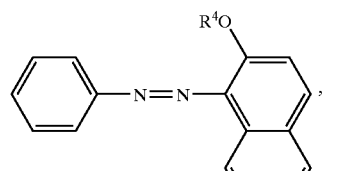
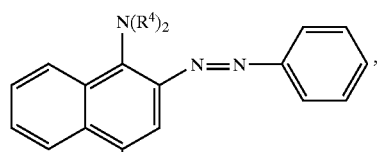
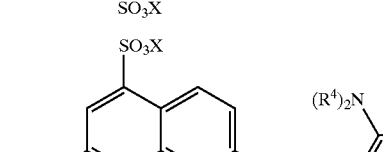
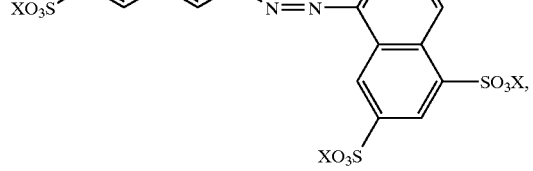
-continued
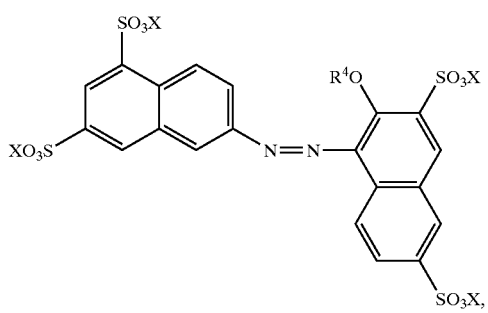
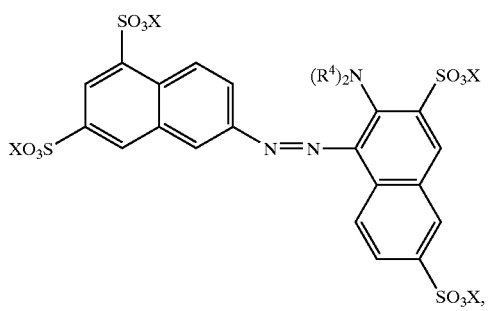
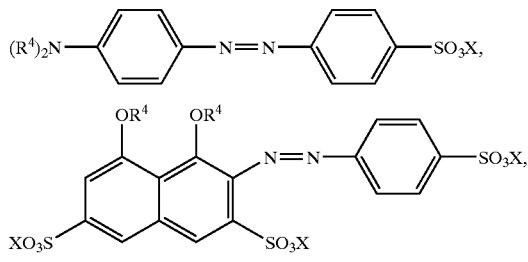
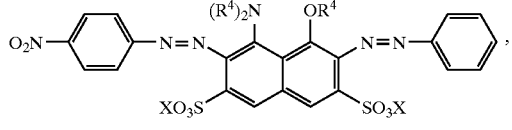
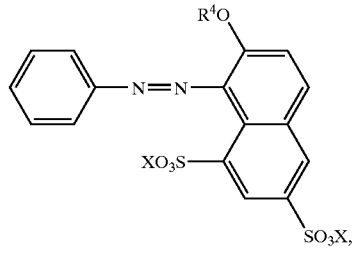
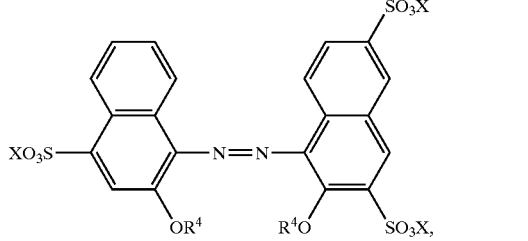
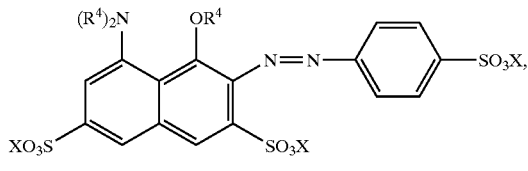

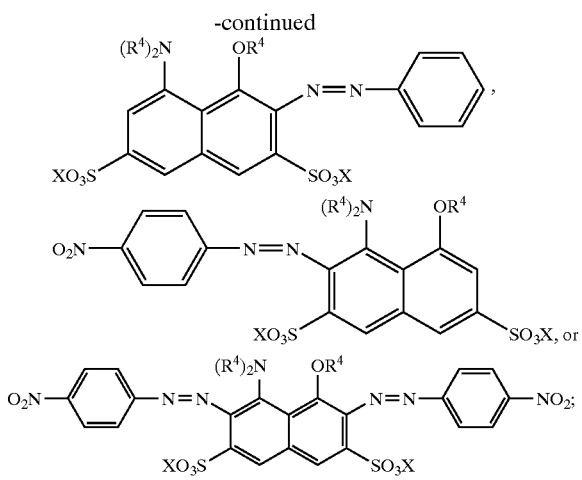

wherein X is selected from the group consisting of H, an alkali metal ion, and an ammonium ion.

The carbonaceous material may be activated by upstream reactions.

Carbonaceous materials which may be used are carbon black, graphite powder, graphite fibers, carbon fibers, carbon fibrils, carbon nanotubes, woven carbon fabric, vitreous carbon products, activated carbon, coal, coke or diamond.

Any known kind of carbon black may be used as the carbonaceous material, such as for example furnace black, gas black, channel black, lamp black, thermal black, acetylene black, plasma black, inversion black, known from DE 195 21 565, carbon blacks containing Si, known from WO 98/45361 or DE 19613796, or carbon blacks containing metal, known from WO 98/42778, arc blacks and carbonaceous materials which are secondary products of chemical production processes.

Carbonaceous materials which are used as a reinforcing filler in rubber compounds may be used. Pigment blacks may be used. Further carbonaceous materials may be: conductive carbonaceous material, carbonaceous material for UV stabilization, carbonaceous material as a filler in systems other than rubber, such as for example in bitumen, plastics, carbonaceous material as a reducing agent in metallurgy.

The present invention also provides a process for the production of a carbonaceous material with organic groups, which comprises: contacting an organic compound of formula I with a carbonaceous material under conditions that are sufficient to cause a reaction.

The organic compound of formula I may be applied onto the carbonaceous material by being incorporated therein or sprayed thereon. The organic compound of formula I may be applied as a powder, melt or solution. It may be particularly advantageous to apply the organic compound during the production of the carbonaceous material, wherein addition of the organic compound of formula I preferably proceeds at a point which is at the necessary temperature. The reaction of the carbonaceous material may preferably be carried out without solvents, but may also be carried out in a solvent, preferably highly volatile organic solvents. The reaction for modifying the carbonaceous material may be carried out at temperatures of −80° to 300° C., preferably of 80° to 300° C. If the reaction proceeds during the production of the carbonaceous material, the temperatures may be between 250° and 1500° C.

The reaction of the carbonaceous material with the organic compound of the general formula I may proceed in a quantity ratio of 99.99:0.01–0.01:99.99, preferably of 50:1–1:50.

The reaction of the carbonaceous material with the organic compound of the general formula I may be performed in a pressure range from 0.001 to 250 bar, preferably from 0.1 to 50 bar.

The present invention also provides a dispersion which is characterised in that it contains the carbonaceous material with organic groups according to the invention.

The organic groups may here be tailored to the particular medium.

Accordingly, carbonaceous materials with polar organic groups may be particularly suitable for polar media. Polar media may be solvents, such as for example alcohols, ketones, esters, acids, amines, halogenated solvents or oligomers or polymers with polar groups, such as for example carbonyl, ester, amino, carboxyl and/or hydroxyl groups. Carbonaceous materials with, for example, —$SO_3X$, COOX, OH (where X is selected from the group consisting of H, an alkali metal ion, an ammonium ion), may be particularly suitable for aqueous media.

Carbonaceous materials with hydrophobic groups, such as for example alkyl, alkyloxy, aryl and/or heteroaryl, may be used for hydrophobic media such as aliphatic, aromatic, heteroaliphatic and/or heteroaromatic hydrocarbons.

Organic groups, for example amino, carbonyl or halogen substituents, which are specifically matched to the media may be used for media which, with regard to their polarity, lie between relatively nonpolar, hydrophobic media and strongly polar media, for example ethers and/or mixtures of nonpolar and polar media.

The dispersions according to the invention may additionally contain one or more additives. These additives, for example monomeric, oligomeric or polymeric compounds, may be added for specific applications. These additives may enhance properties such as degree of dispersion, storage stability, frost stability, drying behavior, film-forming ability, crosslinkability and/or adhesion to certain substrate materials, such as paper, metal, glass, polymers, fibers, leather, wood, concrete or rubber.

The carbonaceous materials with organic groups according to the invention may, for example, be used as a filler, reinforcing filler, UV stabilizer, conductive carbon black or pigment.

The carbonaceous materials with organic groups according to the invention may be used in rubber, plastics, printing inks, inks, inkjet inks, toners, lacquers, paints, paper, bitumen, concrete and other building materials. They may be used as reducing agents in metallurgy.

The carbonaceous materials according to the invention may be used to produce rubber compounds, in particular in tire production.

The carbonaceous materials with organic groups according to the invention exhibit several advantages. The process described herein allows for the preparation of carbonaceous material that possess a wide ranging degree of solubility properties. For example, polar functionalities (e.g., —$SO_3X$) are readily incorporated within the carbonaceous material that results in material, which is more readily dispersible in polar systems, e.g., solutions that are composed primarily of water. On the other hand, the introduction of alkyl groups, for example, within the carbonaceous material can impart a significant degree of nonpolarity, thus rendering the derivatized material a greater degree of solubility in oil.

Additionally, the process described herein provides for an opportunity to introduce systematically a greater degree of substituents within the carbonaceous material proper. The process disclosed herein provides a means of stabilizing a variety of substituents. For example, a polar substituent may be electrostatically stabilized or a sterically bulky substituent may be sterically stabilized. Thus, carbonaceous products may be prepared that are sufficiently stable in aqueous milieu, for example, without the addition of ancillary agents typically used for stabilization. This aspect is particularly important for carbonaceous material used in dispersion formulations; whereby judicious choice of the introduced groups can give rise to dispersions having lower viscosities and exhibit better coloristic properties, such as color depth and blue cast. Moreover, it becomes possible to introduce bound dyes within the carbonaceous material, and thereby render materials which exhibit modified color shades.

This process allows for the introduction of reactive groups within the carbonaceous material which may be used for coupling and crosslinking in systems (for example as used in the production of carbonaceous rubbers). Additionally, carbonaceous materials with the appropriate reactive functionalities provide an opportunity to permit either reversible or irreversible binding to polymeric materials.

Finally, a final aspect that deserves mentioning deals with the fact that the process yields carbonaceous material with a low content of secondary products, salts, acids and moisture.

Having generally described this invention, a further understanding is obtainable by reference to certain specific examples which are provided herein for purposes of illustration only, and are not intended to be limiting unless otherwise specified.

EXAMPLES

Example 1

Synthesis of 8-amino-2,7-bis(4'-nitrobenzeneazo)-1-naphthol-3,6-disulfonic acid, Disodium Salt (1)

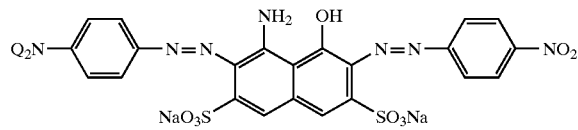

(1)

0.01 mol of 1-amino-8-naphthol-3,6-disulfonic acid are dissolved in 150 ml of water and then combined with 8 g of sodium acetate and 8 g of glacial acetic acid. The mixture is cooled to 10° C. 0.022 mol of the diazonium salt of 4-nitroaniline ("Organikum", 19th edition, p. 560, Verlag Johann Ambrosius Barth Leipzig) are slowly added at this temperature. The mixture is then stirred overnight, after which 200 ml of water are added and the mixture salted out with sodium chloride. The product is removed by suction filtration and dried in a desiccator.

Example 2

Synthesis of 2-amino-1-(naphthyl-2'-azo)-naphthyl-5,5',7,7'-tetrasulfonic acid, Tetrasodium Salt (2)

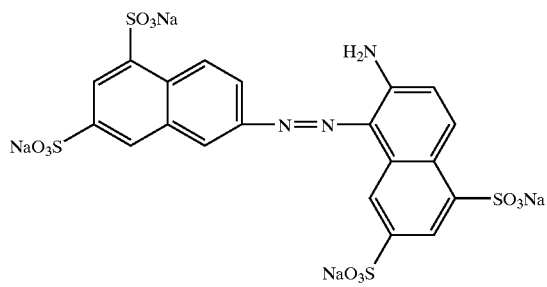

(2)

3 g of the diazonium salt of 2-naphthylamine-6,8-disulfonic acid ("Organikum", 19th edition, p. 560, Verlag Johann Ambrosius Barth Leipzig) are added at 10° C. to 120 ml of an aqueous suspension of 2.7 g of 2-naphthylamine-6,8-disulfonic acid and 3 g of sodium acetate, wherein 2 ml of acetic acid are subsequently added dropwise with stirring. After 24 hours stirring, the product is precipitated with ethanol, removed by suction filtration and dried in a desiccator.

Example 3

Synthesis of 2-hydroxy-1-(naphthyl-2'-azo)-naphthyl-3,6,5',7'-tetrasulfonic acid, Tetrasodium Salt (3)

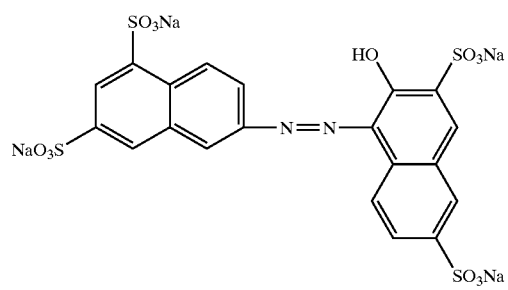

(3)

3 g of the diazonium salt of 2-naphthylamine-6,8-disulfonic acid ("Organikum", 19th edition, p. 560, Verlag Johann Ambrosius Barth Leipzig) are added at 10° C. to 120 ml of an aqueous suspension of 2.7 g of sodium 2-naphthol-3,6-disulfonate and 3 g of sodium acetate, wherein 2 ml of acetic acid are subsequently added dropwise with stirring. After 24 hours stirring, the product is precipitated with ethanol, removed by suction filtration and dried in a desiccator.

Example 4

Reaction of Carbon Black with Azo Compounds

The mixture of azo compound and carbon black is produced either by incorporating the carbon black into a solution of the azo compound, subsequently stirring the mixture for 1 hour at room temperature and evaporating the solvent in a drying cabinet (variant 1) or by mixing in a mixer (variant 2). The mixture is then heat-treated for 10 hours at 250° C. in a drying cabinet without air circulation, or is irradiated with microwave radiation three times for 1 minute at 700 Watt in a microwave oven. Tables 1a and 1b summarize the examples of the carbonaceous materials with organic groups according to the invention.

TABLE 1a

| No. | Carbon black | Azo compound | Mixture production using variant | Solvent | Reactor |
|---|---|---|---|---|---|
| 1 | FW 18 | Naphthol blue black (CI 20470) | 1 | Water | Drying cabinet |
| 2 | FW 18 | Naphthol blue black (CI 20470) | 2 | — | Microwave oven |
| 3 | NiPex 160 IQ | Naphthol blue black (CI 20470) | 1 | Water | Microwave oven |
| 4 | NiPex 160 IQ | Naphthol blue black (CI 20470) | 2 | — | Drying cabinet |
| 5 | FW 18 | Orange G (CI 16230) | 1 | Water | Drying cabinet |
| 6 | FW 18 | Orange G (CI 16230) | 2 | — | Microwave oven |
| 7 | FW 18 | Orange G (CI 16230) | 1 | Water | Microwave oven |
| 8 | FW 18 | Orange G (CI 16230) | 2 | — | Drying cabinet |
| 9 | FW 18 | Methyl orange (CI 13025) | 1 | Water | Drying cabinet |
| 10 | FW 18 | Methyl orange (CI 13025) | 2 | — | Microwave oven |
| 11 | FW 18 | Methyl orange (CI 13025) | 1 | Water | Microwave oven |
| 12 | FW 18 | Methyl orange (CI 13025) | 2 | — | Drying cabinet |
| 13 | FW 18 | Hydroxy naphthol blue | 1 | Water | Drying cabinet |
| 14 | FW 18 | Hydroxy naphthol blue | 2 | — | Microwave oven |
| 15 | FW 18 | Hydroxy naphthol blue | 1 | Water | Microwave oven |
| 16 | FW 18 | Hydroxy naphthol blue | 2 | — | Drying cabinet |
| 17 | FW 18 | Sulfanil azo chromotrope | 1 | Water | Drying cabinet |
| 18 | FW 18 | Sulfanil azo chromotrope | 2 | — | Microwave oven |
| 19 | FW 18 | Sulfanil azo chromotrope | 1 | Water | Microwave oven |
| 20 | FW 18 | Sulfanil azo chromotrope | 2 | — | Drying cabinet |
| 21 | FW 18 | Azobenzene | 1 | Toluene | Drying cabinet |
| 22 | FW 18 | Azobenzene | 2 | — | Microwave oven |
| 23 | FW 18 | Azobenzene | 1 | Toluene | Microwave oven |
| 24 | FW 18 | Azobenzene | 2 | — | Drying cabinet |
| 25 | FW 18 | Azobenzene 4-carboxylic acid | 1 | Water | Drying cabinet |
| 26 | FW 18 | Azobenzene 4-carboxylic acid | 2 | — | Microwave oven |

TABLE 1b

| No. | Carbon black | Azo compound | Mixture production using variant | Solvent | Reactor |
|---|---|---|---|---|---|
| 27 | FW 18 | Azobenzene 4-carboxylic acid | 1 | Water | Microwave oven |
| 28 | FW 18 | Azobenzene 4-carboxylic acid | 2 | — | Drying cabinet |
| 29 | Printex 95 | 4-Sulfonamidoazobenzene[1] | 1 | Acetone | Drying cabinet |
| 30 | Printex 95 | 4-Sulfonamidoazobenzene[1] | 2 | — | Microwave oven |
| 31 | Printex 95 | 4-Sulfonamidoazobenzene[1] | 1 | Acetone | Microwave oven |
| 32 | Printex 95 | 4-Sulfonamidoazobenzene[1] | 2 | — | Drying cabinet |
| 33 | N 220 | 4-Rhodanoazobenzene[2] | 1 | Acetone | Drying cabinet |
| 34 | N 220 | 4-Rhodanoazobenzene[2] | 2 | — | Microwave oven |
| 35 | N 220 | 4-Rhodanoazobenzene[2] | 1 | Acetone | Microwave oven |
| 36 | N 220 | 4-Rhodanoazobenzene[2] | 2 | — | Drying cabinet |
| 37 | FW 18 | Azo compound according to Ex. 1 | 1 | Water | Drying cabinet |
| 38 | FW 18 | Azo compound according to Ex. 1 | 2 | — | Microwave oven |
| 39 | NiPex 160 IQ | Azo compound according to Ex. 1 | 1 | Water | Microwave oven |
| 40 | NiPex 160 IQ | Azo compound according to Ex. 1 | 2 | — | Drying cabinet |
| 41 | FW 18 | Azo compound according to Ex. 2 | 1 | Water | Drying cabinet |
| 42 | FW 18 | Azo compound according to Ex. 2 | 2 | — | Microwave oven |
| 43 | NiPex 160 IQ | Azo compound according to Ex. 2 | 1 | Water | Microwave oven |
| 44 | NiPex 160 IQ | Azo compound according to Ex. 2 | 2 | — | Drying cabinet |
| 45 | FW 18 | Azo compound according to Ex. 3 | 1 | Water | Drying cabinet |
| 46 | FW 18 | Azo compound according to Ex. 3 | 2 | — | Microwave oven |
| 47 | NiPex 160 IQ | Azo compound according to Ex. 3 | 1 | Water | Microwave oven |
| 48 | NiPex 160 IQ | Azo compound according to Ex. 3 | 2 | — | Drying cabinet |
| 49 | Printex 35 | Bis-[4,4'-(diisobutylamino)]-azobenzene[3] | 1 | Toluene | Drying cabinet |
| 50 | Printex 35 | Bis-[4,4'-(diisobutyl-amino)]azobenzene[3] | 2 | — | Microwave oven |
| 51 | Printex 35 | Bis-[4,4'-(diisobutyl-amino)]azobenzene[3] | 1 | Toluene | Microwave oven |
| 52 | Printex 35 | Bis-[4,4'-(diisobutyl-amino)]azobenzene[3] | 2 | — | Drying cabinet |

TABLE 1b-continued

| No. | Carbon black | Azo compound | Mixture production using variant | Solvent | Reactor |
|---|---|---|---|---|---|

[1] according to Chrzaszczewska et al., Rocz. Chem. 17 (1937) 411
[2] according to Badger et al, J. Chem. Soc. (1953) 2147
[3] according to Lippmann Chem. Ber. 15 (1882) 2163
The carbon blacks FW 18 and NiPex 160 IQ are gas blacks from Degussa AG. The carbon blacks Printex 35, Printex 95 and N 220 are furnace blacks from Degussa AG.

Example 5

Production and Characterization of Dispersions According to the Invention

Average particle size and zeta potential are determined by photon correlation spectroscopy (PCS). Zeta potential, which describes the charge state of the particles, provides an indication of the stability of the dispersion.

The instrument used is a Nicomp N370 (Hiac/Royco) photon correlation spectrometer with measurement cells (10 mm disposable measurement cells). Measurement is performed in a 1% AMP 90 solution (prepared with ultrapure water; AMP 90 is a 2-amino-2-methyl-1-propanol solution from Angus Chemie). This solution is initially introduced into the disposable measurement cell and a few drops of sample suspension are added thereto by pipette until an intensity of 300 (±50) kHz is reached (instrument display at sensitivity 150) or the intensity ceases to rise despite further addition of sample. An excessively high sample concentration should be avoided. Measurement is started in automatic mode. Measurement time is generally 40 minutes. Evaluation is performed by Gaussian analysis (volume distribution). If the value for BASELINE ADJUST is >1 or the measurement is not yet sufficiently stable (>5%/10 minutes), the measurement time is extended. The measurement is performed as a duplicate determination. The span of the mean values should be <10%.

Zeta potential is determined with an MBS-8000 instrument from Matec. The optimum volume concentration for measurement is between 2 and 3 vol. %.

The pH value is determined directly in the carbon black dispersion using a conventional commercial measuring electrode.

Stability Testing

The dispersion is stored for 28 days at room temperature, then frozen to −30° C. and heated to 70° C. Viscosity is determined beforehand and afterwards as a measure of stability.

The degree of dispersion is estimated by microscope. To this end, the undiluted dispersion is observed at 400 times magnification under a Nikon light microscope. If no discrete particles are to be observed under these conditions, the dispersion meets requirements with regard to degree of dispersion.

Production of Aqueous Dispersions

15% of carbonaceous material with organic groups (Example 3, nos. 1–20; 25–28; 37–48) are combined with 0.3% biocide (Acticide MBS from Thor Chemie) and the mixture is made up to 100% with water. A predispersion is prepared therefrom with an Ultra Turrax T50 disperser and dispersing tool. Further processing proceeds in a continuous ultrasound disperser (Dr. Hielscher GmbH, model UIP 500). After dispersion, a pH value of between 7 and 9 is established by addition of base, such as for example AMP 90 (Angus Chemie). Table 2 shows the analytical data for some aqueous dispersions.

TABLE 2

| Dispersion No. | Carbonaceous material with organic groups according to Example 3, no. | Degree of dispersion | Average particle size [nm] | Zeta potential [mV] | Viscosity after 1 day [cPs] | Viscosity after 28 days [cPs] |
|---|---|---|---|---|---|---|
| 1 | 1 | * | 75 | −52 | 2.19 | 2.44 |
| 2 | 7 | * | 96 | −48 | 3.97 | 5.01 |
| 3 | 10 | * | 81 | −53 | 2.38 | 3.22 |
| 4 | 37 | * | 90 | −40 | 2.65 | 2.78 |
| 5 | 48 | * | 71 | −47 | 2.42 | 2.57 |

*Meets requirements (see above)

Production of Solvent-Containing Dispersions

15–30% of carbonaceous material with organic groups (Example 3, nos. 21–24; 29–36; 49–52) are made up to 100% with solvents, such as toluene, methanol and 2-butoxyethyl acetate. A predispersion is prepared therefrom with an Ultra Turrax T50 disperser and dispersing tool. Further processing proceeds in a continuous ultrasound disperser (Dr. Hielscher GmbH, model UIP 500). Table 3 shows the analytical data for some solvent-containing dispersions.

TABLE 3

| Dispersion No. | Carbonaceous material with organic groups according to Example 3, no. | Solvent | Degree of dispersion |
|---|---|---|---|
| 6 | 21 | Toluene | * |
| 7 | 22 | 2-Butoxyethyl acetate | * |
| 8 | 23 | Toluene | * |
| 9 | 24 | 2-Butoxyethyl acetate | * |
| 10 | 29 | Methanol | * |
| 11 | 30 | 2-Butoxyethyl acetate | * |
| 12 | 31 | Methanol | * |
| 13 | 32 | 2-Butoxyethyl acetate | * |
| 14 | 33 | Toluene | * |
| 15 | 34 | 2-Butoxyethyl acetate | * |
| 16 | 35 | Toluene | * |
| 17 | 36 | 2-Butoxyethyl acetate | * |
| 18 | 49 | Toluene | * |

TABLE 3-continued

| Dispersion No. | Carbonaceous material with organic groups according to Example 3, no. | Solvent | Degree of dispersion |
|---|---|---|---|
| 19 | 50 | 2-Butoxyethyl acetate | * |
| 20 | 51 | Toluene | * |
| 21 | 52 | 2-Butoxyethyl acetate | * |

* Meets requirements (see above)

Example 6

Applicational Tests in Aqueous Inkjet Formulations

Inkjet inks are formulated for test purposes on the basis of the aqueous dispersions according to the invention. To this end, the dispersions are combined with additives, Table 4, and printed with a Hewlett-Packard Deskjet 970 cxi. Printing behaviour and the printed image are evaluated visually and optical density (OD) determined on test prints with a Macbeth RD 918 densitometer. The print results for the inks in Table 5 are based on the dispersions from Table 2.

TABLE 4

Ink Composition

| Ink Constituents | Amount (wt. %) |
|---|---|
| Carbonaceous material according to the invention with organic groups | 5 |
| 1,2-propanediol | 5 |
| 2-pyrrolidone | 12 |
| Surfynol 465 (Air Products) | 0.02 |
| Liponic EG-07 (Permcos GmbH) | 3.0 |
| Deionized water | q.s. |

TABLE 5

| Dispersion according to Example 4, no. | Printing behaviour | Printed image | OD Copy paper | OD HP 51634Z | OD Epson 720 dpi | OD Canon HR-101 | OD Schoeller |
|---|---|---|---|---|---|---|---|
| 1 | Fine striping at beginning, then no problem | 2 | 1.48 | 1.47 | 1.59 | 1.46 | 1.47 |
| 2 | Fine striping at beginning, then no problem | 1 | 1.49 | 1.52 | 1.56 | 1.54 | 1.51 |
| 3 | No problems | 1 | 1.56 | 1.57 | 1.61 | 1.60 | 1.51 |
| 4 | No problems | 1 | 1.51 | 1.57 | 1.59 | 1.61 | 1.53 |
| 5 | No problems | 1 | 1.56 | 1.54 | 1.68 | 1.64 | 1.56 |

The priority document of the present application, DE 102 38 149.6, filed Aug. 15, 2002, is incorporated herein by reference.

Obviously, numerous modifications and variations on the present invention are possible in light of the above teachings. It is therefore to be understood that within the scope the appended claims, the invention may be practiced otherwise than as specifically described herein.

What is claimed is:

1. A carbonaceous material with organic groups, obtained by a process comprising:
   contacting an organic compound of formula I with a carbonaceous material during the production of said carbonaceous materials, wherein said contacting is under conditions that are sufficient to cause a reaction;

$$R^1\!-\!N\!=\!N\!-\!R^2 \qquad (I)$$

wherein $R^1$ and $R^2$ may be identical or different and are aryl groups which are unsubstituted or substituted with one or more acceptor substituents or one or more donor substituents, and wherein the conditions that are sufficient to cause reaction occurs within a temperature range of from 250° to 1500° C.

2. A carbonaceous material with organic groups according to claim 1, wherein one or more acceptor substituents is selected from the group consisting of —$COOR^3$, —$COR^3$, —CN, —SCN, —NCS, —NCO, —$NO_2$, —$SO_2R^3$, —$SO_2N(R^3)_2$, —$SO_3R^3$, —$SO_3X$, —COOX; wherein $R^3$ is identical or different and is selected from the group consisting of H, an alkyl, an aryl, a functionalized alkyl, and a functionalized aryl; and wherein X is selected from the group consisting of H, an alkali metal ion, and an ammonium ion.

3. A carbonaceous material with organic groups according to claim 1, wherein one or more donor substituents is selected from the group consisting of an alkyl group, an aryl group, $OR^4$, $N(R^4)_2$, $SR^4$, —S—S—$R^4$, and $P(R^4)_2$; wherein $R^4$ is identical or different and is selected from the group consisting of H, an alkyl, an aryl, a functionalized alkyl, and a functionalized aryl.

4. A carbonaceous material with organic groups according to claim 1, wherein the contacting of the organic compound of formula I to the carbonaceous material occurs as a powder, melt or solution.

5. A carbonaceous material with organic groups according to claim 1, wherein the contacting occurs in the absence of a solvent.

6. A carbonaceous material with organic groups according to claim 1, wherein the contacting occurs in the presence of a solvent.

7. A carbonaceous material with organic groups according to claim 1, wherein the ratio of the carbonaceous material to the organic compound of formula I ranges from 99.99:0.01 to 0.01:99.99.

8. A carbonaceous material with organic groups according to claim 1, wherein the ratio of the carbonaceous material to the organic compound of formula I ranges from 50:1 to 1:50.

9. A process for the production of the carbonaceous material with organic groups comprising:
   contacting an organic compound of formula I with a carbanaceous material during the production of said carbonaceous materials, wherein said contacting is under conditions that are sufficient to cause a reaction;

$$R^1\!-\!N\!=\!N\!-\!R^2 \qquad (I)$$

wherein $R^1$ and $R^2$ may be identical or different and are aryl groups which are unsubstituted or substituted with one or more acceptor substituents or one or more donor substituents, and wherein the condition that are sufficient to cause reaction occurs within a temperature range of from 250° to 1500° C.

10. A process for the production of the carbonaceous material with organic groups according to claim 9, wherein the contacting of the organic compound of formula I to the carbonaceous material occurs as a powder, melt or solution.

11. A process for the production of the carbonaceous material with organic groups according to claim 9; wherein the contacting occurs in the absence of a solvent.

12. A process for the production of the carbonaceous material with organic groups according to claim 9, wherein the contacting occurs in the presence of a solvent.

13. A process for the production of the carbonaceous material with organic groups according to claim 9, wherein the ratio of the carbonaceous material to the organic compound of formula I ranges from 99.99:0.01 to 0.01:99.99.

14. A process for the production of the carbonaceous material with organic groups according to claim 9; wherein the ratio of the carbonaceous material to the organic compound of formula I ranges from 50:1 to 1:50.

15. A composition, comprising:
the carbonaceous material with organic groups according to claim 1 and a carrier.

16. A composition according to claim 15, wherein the carrier is selected from the group consisting of rubber, plastic, ink, toner, lacquer, paint, paper, bitumen, and concrete.

17. A composition according to claim 16, wherein the ink is printing ink or inkjet ink.

18. A dispersion, comprising:
the carbonaceous material with organic groups according to claim 1 and an additive.

19. A dispersion according to claim 18, wherein the additive is selected from the group consisting of a monomeric compound, an oligomeric compound, and a polymeric compound.

20. A tire, comprising:
the carbonaceous material with organic groups according to claim 1 and a rubber.

21. A filled composition, comprising:
a matrix material containing the carbonaceous material with organic groups according to claim 1; wherein the matrix material is selected from the group consisting of paper, plastic, metal, glass, a polymer, a fiber, leather, wood, concrete, and rubber.

22. A carbonaceous material with organic groups, obtained by a process comprising:
contacting an organic compound of formula I with a carbonaceous material under conditions that are sufficient to cause a reaction;

$$R^1—N=N—R^2 \quad (I)$$

wherein $R^1$ and $R^2$ may be identical or different and are aryl groups which are unsubstituted or substituted with one or more acceptor substituents or one or more donor substituents, and wherein the ratio of the carbonaceous material to the organic compound of formula I ranges from 99.99:0.01 to 0.01:99.99.

23. A carbonaceous material with organic groups according to claim 22, wherein the conditions that are sufficient to cause a reaction occur within a temperature range of from −80° to 300° C.

24. A carbonaceous material with organic groups according to claim 22, wherein said contacting occurs during production of the carbonaceous material and wherein said conditions that are sufficient to cause reaction occurs within a temperature range of from 250° to 1500° C.

25. A carbonaceous material with organic groups according to claim 22, wherein one or more acceptor substituents is selected from the group consisting of —$COOR^3$, —$COR^3$, —CN, —SCN, —NCS, —NCO, —$NO_2$, —$SO_2R^3$, —$SO_2N(R^3)_2$, —$SO_3R^3$, —$SO_3X$, —COOX; wherein $R^3$ is identical or different and is selected from the group consisting of H, an alkyl, an aryl, a functionalized alkyl, and a functionalized aryl; and wherein X is selected from the group consisting of H, an alkali metal ion, and an ammonium ion.

26. A carbonaceous material with organic groups according to claim 22, wherein one or more donor substituents is selected from the group consisting of an alkyl group, an aryl group, $OR^4$, $N(R^4)_2$, $SR^4$, —S—S—$R^4$, and $P(R^4)_2$; wherein $R^4$ is identical or different and is selected from the group consisting of H, an alkyl, an aryl, a functionalized alkyl, and a functionalized aryl.

27. A carbonaceous material with organic groups according to claim 22, wherein the contacting of the organic compound of formula I to the carbonaceous material occurs as a powder, melt or solution.

28. A carbonaceous material with organic groups according to claim 22, wherein the contacting occurs in the absence of a solvent.

29. A carbonaceous material with organic groups according to claim 22, wherein the contacting occurs in the presence of a solvent.

30. A carbonaceous material with organic groups according to claim 22, wherein the ratio of the carbonaceous material to the organic compound of formula I ranges from 50:1 to 1:50.

31. A dispersion, comprising:
the carbonaceous material with organic groups according to claim 22 and an additive.

32. A dispersion according to claim 31, wherein the additive is selected from the group consisting of a monomeric compound, an oligomeric compound, and a polymeric compound.

33. A tire, comprising:
the carbonaceous material with organic groups according to claim 22 and a rubber.

34. A filled composition, comprising:
a matrix material containing the carbonaceous material with organic groups according to claim 22; wherein the matrix material is selected from the group consisting of paper, plastic, metal, glass, a polymer, a fiber, leather, wood, concrete, and rubber.

35. A process for the production of the carbonaceous material with organic groups comprising:
contacting an organic compound of formula I with a carbonaceous material under conditions that are sufficient to pause a reaction;

$$R^1—N=N—R^2 \quad (I)$$

wherein $R^1$ and $R^2$ may be identical or different and are aryl groups which are unsubstituted or substituted with one or more acceptor substituents or one or more donor substituents, and wherein the ratio of the carbonaceous material to the organic compound of formula I ranges from 99.99:0.01 to 0.01:99.99.

36. A process for the production of the carbonaceous material with organic groups according to claim 35, wherein the conditions that are sufficient to cause a reaction occur within a temperature range of from −80° to 300° C.

37. A process for the production of the carbonaceous material with organic groups according to claim 35, wherein the conditions that are sufficient to cause a reaction occur within a temperature range of from −80° to 300° C.

38. A process for the production of the carbonaceous material with organic groups according to claim 35, wherein the contacting of the organic compound of formula I to the carbonaceous material occurs as a powder, melt or solution.

39. A process for the production of the carbonaceous material with organic groups according to claim 35; wherein the contacting occurs in the absence of a solvent.

40. A process for the production of the carbonaceous material with organic groups according to claim 35, Wherein the contacting occurs in the presence of a solvent.

41. A process for the production of the carbonaceous material with organic groups according to claim 35; wherein the ratio of the carbonaceous material to the organic compound of formula I ranges from 50:1 to 1:50.

42. A composition, comprising:

the carbonaceous material with organic groups according to claim 22 and a carrier.

43. A composition according to claim 42, wherein the carrier is selected from the group consisting of rubber, plastic, ink, toner, lacquer, paint, paper, bitumen, and concrete.

44. A composition according to claim 43, wherein the ink is printing ink or inkjet ink.

* * * * *